(12) United States Patent  
Kline

(10) Patent No.: US 6,532,328 B1
(45) Date of Patent: Mar. 11, 2003

(54) NETWORK CABLE WITH OPTICAL IDENTIFICATION ELEMENT

(75) Inventor: David Warren Kline, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/703,345

(22) Filed: Oct. 31, 2000

(51) Int. Cl.[7] ................................................. G02B 6/44
(52) U.S. Cl. ...................................................... 385/101
(58) Field of Search .......................... 385/101, 39, 55, 385/73, 89, 100, 88, 76, 31

(56) References Cited

U.S. PATENT DOCUMENTS

| | | | | |
|---|---|---|---|---|
| 4,074,187 A | * | 2/1978 | Miller et al. ................... | 324/51 |
| 5,666,453 A | * | 9/1997 | Dannenman ................ | 385/101 |
| 6,043,839 A | * | 3/2000 | Adair et al. .................... | 348/76 |
| 6,163,643 A | * | 12/2000 | Bergmann et al. ........... | 385/140 |

* cited by examiner

Primary Examiner—Brian Sircus
Assistant Examiner—J. F. Duverne
(74) Attorney, Agent, or Firm—Joseph P. Lally; J. Bruce Schelkopf; Casimer K. Salys

(57) ABSTRACT

A cable suitable for use in a data processing network is disclosed. The cable includes an electrically insulating shielding, a signal carrying element enclosed by the shielding, and an identifying element embedded in the shielding. The identifying element is suitable for transporting light from a first end of the cable to a second end and for externally emitting the light at the second end. The signal carrying element be implemented as a twisted wire pair, a coaxial cable, or an optical fiber. The identifying element may include an optical fiber that is connected to a lens embedded in the shield at the second end of the cable. The first end of the optical fiber may be connected to another lens that is embedded in the shielding at the first end of the cable. Alternatively, the first end of the optical fiber may be connected to an LED, which is connected to a circuit including a battery aid a contact switch. The identifying element may include a light pipe connected between the optical fiber and the lens embedded in the surface of the cable at the second end. The cable may further include a second light pipe and connected to a lens embedded in the surface of the cable at the first end.

21 Claims, 3 Drawing Sheets

NETWORK CABLE WITH OPTICAL IDENTIFICATION ELEMENT

BACKGROUND

1. Field of the Present Invention

The present invention generally relates to the field of data processing network hardware and more particularly to data processing network cabling incorporating an optical element that facilitates individual cable identification.

2. History of Related Art

Computer networks are becoming increasing prevalent in virtually every area where data processing systems are employed. In a typical network, a number of devices are interconnected using cables that connect to suitable receptacles in each device. The types of devices that a network may include vary widely with the implementation. Computer networks may include one or more terminals, desktop systems, servers, mainframes, routers, hubs, switches, printers, and various other devices that will be familiar to those skilled in the design of data processing networks. If the network is relatively small and stable (i.e., the network configuration does not change frequently), the interconnecting cables may be wired directly from one device in the network to another without difficulty. In a network with a large number of devices and a larger number of cables, however, it may be difficult to determine one cable from another. The inability to identify individual cables can result in much time and effort being wasted trying to physically tracing cables from one end to another. Similarly, in a network development environment in which network configuration changes may occur frequently, the ability to identify individual cables quickly is highly desirable. Typically cable identification is achieved using differently colored cables or by labeling each cable at both ends with an appropriate and unique label. Color coding schemes are ineffective for systems that include large number of cables while labeling is a time consuming and only marginally effective solution because it is difficult to keep the labels attached to their corresponding cables. It would be, therefore, highly desirable to implement a cable that facilitated easy and reliable identification of individual cables without introducing excessive cost or complexity to the cables.

SUMMARY OF THE INVENTION

The problems identified above are in large part addressed by a cable suitable for use in a data processing network as disclosed herein. The cable typically includes an electrically insulating shielding, a signal carrying element enclosed by the shielding, and an identifying element embedded in the shielding. The identifying element is suitable for transporting light from a first end of the cable to a second end and for externally emitting the light at the second end. The signal-carrying element may be implemented as a twisted wire pair, a coaxial cable, or an optical fiber. The identifying element may include an optical fiber that is connected to a lens embedded in the shield at the second end of the cable. The first end of the optical fiber may be connected to another lens that is embedded in the shielding at the first end of the cable. Alternatively, the first end of the optical fiber may be connected to an LED, which is connected to a circuit including a battery and a contact switch. The identifying element may include a light pipe connected between the optical fiber and the lens embedded in the surface of the cable at the second end. The cable may further include a second light pipe connected to a lens embedded in the surface of the cable at the first end.

BRIEF DESCRIPTION OF THE DRAWINGS

Other objects and advantages of the invention will become apparent upon reading the following detailed description and upon reference to the accompanying drawings in which.

Figure 1:
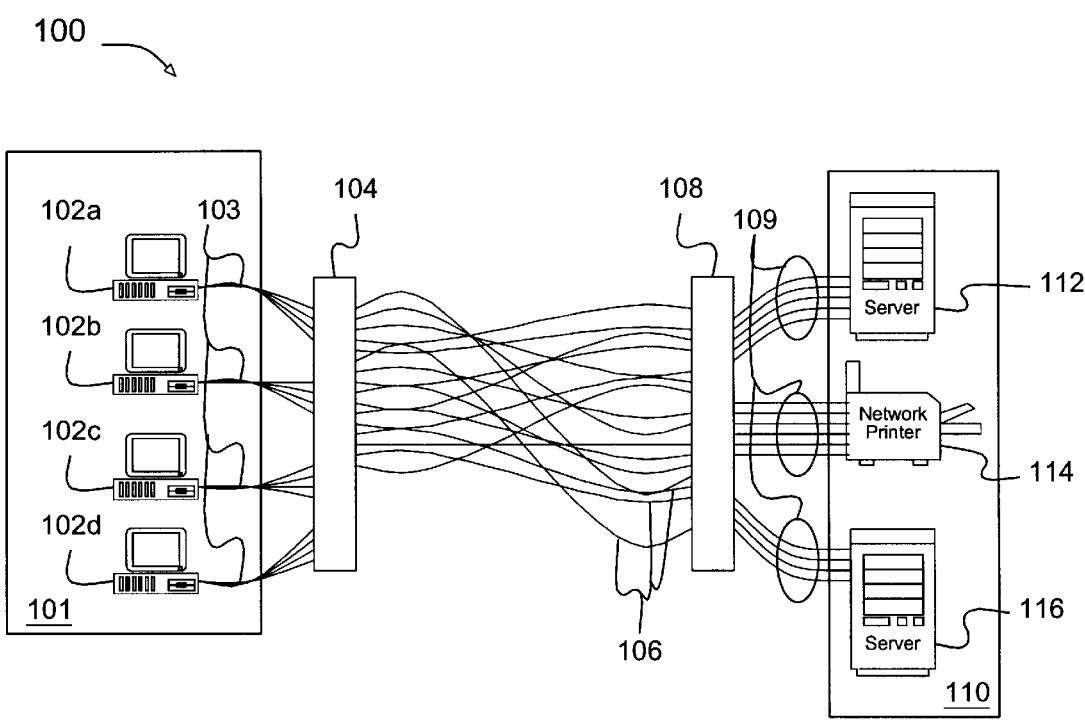
FIG. 1 illustrates a computer network including cabling according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 illustrates an exemplary embodiment of a data processing network 100. In the depicted embodiment, network 100 includes a first set of devices 101. In the depicted, the first set of devices 101 includes a number of users stations 102a, 102b, 102c, 102d (generically or collectively referred to herein as user station (s) 102) that are connected to a switch panel 104 by a first group of cables 103.

User stations 102 may be implemented as network computing machines (thin clients), dumb terminals, desktop or laptop computers, and so forth. User stations 102 typically include one or more processors, a system memory that is accessible to the processor(s), an input device such as a keyboard, mouse, (or both), and a display device. In other embodiments of network 100, the first set of devices 101 may include devices of other types such as servers, printers, routers, hubs, etc. The first set of devices 101 may be physically located in proximity to each other, such as in a single room or a particular portion of a raised floor laboratory.

Switch panel 104 may include a number of pass-through connectors that facilitate a connection between the first set of cables 103 and a second set of cables 106. The second set of cables 106 carry signals between first switch panel 104 and a second switch panel 108. Second switch panel 108 is connected through a third set of cables 109 to a second set of devices 110. In the depicted embodiment, the second set of devices 110 includes a server 112, a network printer 114, and a second server 116. Servers 112 and 116 may be implemented with any of a variety of server systems without departing from the spirit and scope of the invention. Suitable servers include UNIX servers such as the RS/6000 server, business servers such as the AS/400 server, and enterprise servers such as the S390 servers all available from IBM Corporation.

The second set of devices 110 may occupy a different physical location than the first set of devices 101 and the second set cables 106 may traverse relatively long distances and may extend beneath a raised floor, above a suspended ceiling, or within a wall. Accordingly, it may be difficult for one positioned at first switch panel 104 to determine where a particular cable originates. If network 100 includes a large number of cables 106, attempting to determine the origin of a particular cable by a trial-and-error process can be unduly time consuming and aggravating. Similarly, first set of cables 103 and third set of cables 109 may include a large number of intertwined cables that make it difficult to trace individual cables. Moreover, although the problem of determining the origin of a particular cable is described and illustrated herein with to a network system that includes multiple devices and accommodates multiple users who are perhaps situated in different physical locations, the cable identification problem may also be encountered in even a simple desktop system (not depicted) in which a single computer is connected to a printer, a display terminal, a keyboard, a mouse, and a telephone line.

The present invention addresses the cable identification problem by incorporating an identification element into the cable itself. The identification element, when activated, enables a user to identify a selected cable by visual inspection thereby eliminating the burdensome task of physically tracing the cable or identifying the cable by trial-and-error. The cable identification apparatus may comprise an active or passive system depending upon the implementation.

Figure 2:
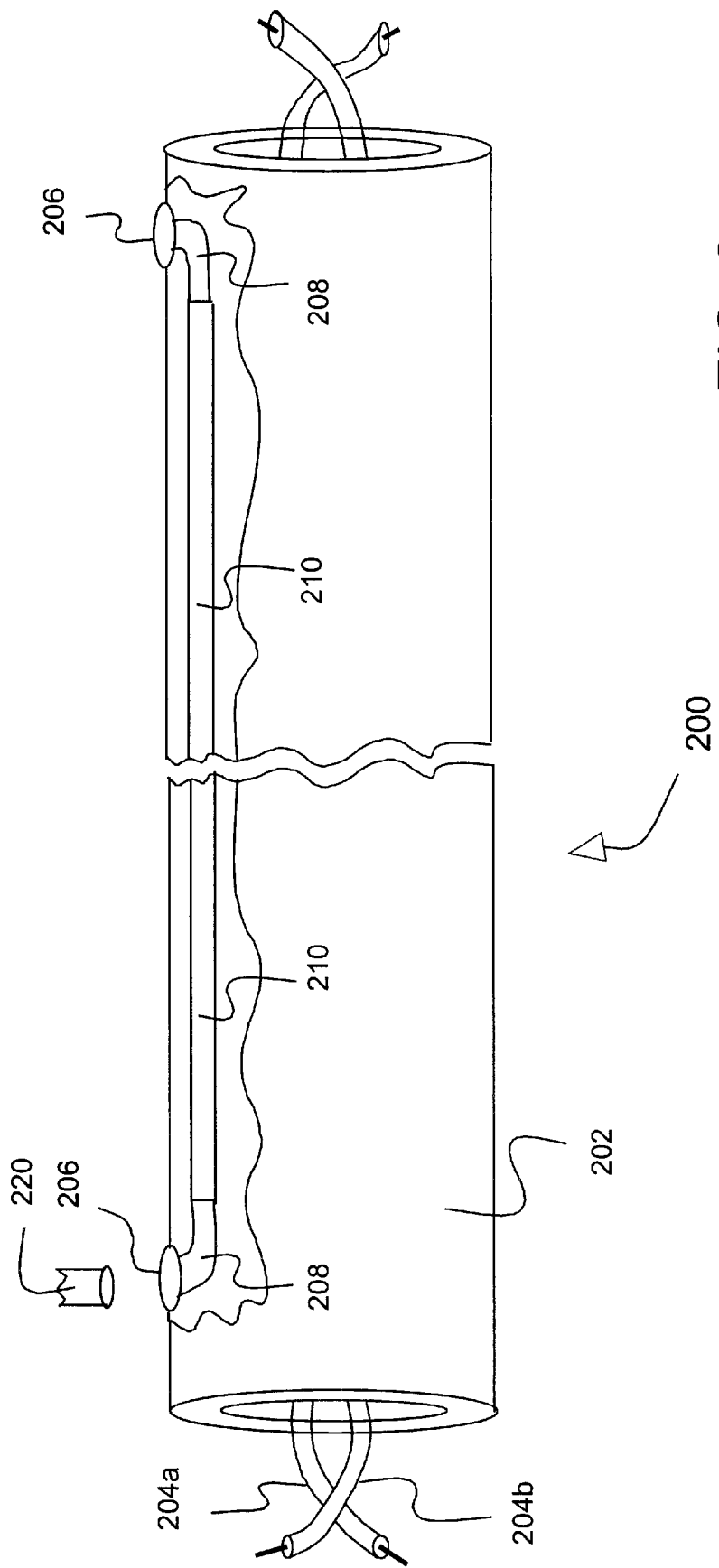
FIG. 2 depicts a cable according to one embodiment of the present invention.

FIG. 2 depicts a cable 200 according to one embodiment of the invention and suitable for use as a cable in the first, second, or third set of cables 103, 106, and 109 in FIG. 1. Cable 200 includes an electrically insulating shield 202 typically comprised of rubber or a synthetic insulator. Shield 202 encloses a pair of signal carriers or conductive elements 204a and 204b (generically or collectively referred herein as conductive element(s) 204). Although the illustration indicates a twisted wire pair implementation of conductive elements 204, alternative embodiment may use a coaxial cable arrangement or an optical fiber. The embodiment depicted in FIG. 2 is a passive implementation of the invention in which cable 200 includes an identification element suitable for transporting externally supplied energy from one end of the cable to the other, where it may be externally detected.

As depicted in FIG. 2, the identification element includes an optical fiber 210 enclosed in the shielding 202 of cable 200. Optical fiber 210 is suitable for carrying light energy and is comprised of a glass core of approximately 9 to 1000 µm in thickness. The core may be surrounded by a glass or plastic cladding that bends the light and confines it to the core. The cladding may be surrounded by primary and secondary buffers that provide mechanical support for the cladding and core.

Light pipes 208 are connected to both ends of optical fiber 210. Each light pipe 208 is typically constructed of a plastic tube with a highly reflective interior surface. The interior of light pipe 208 may include a series of triangulated cuts that produce light reflecting surfaces configured to propagate light along the interior of the light pipe.

Each light pipe 208 is connected between the optical fiber 210 at one end and a corresponding lens 206 at its other end. The lens 206 may comprise a concave glass or plastic structure embedded in the surface of shielding 202 such that the lens is externally visible. Lens 206 is suitable for focusing externally supplied light onto optical fiber 210 (via light pipes 208) at one end of cable 200 and for magnifying light at the other end of optical fiber 210.

As configured in FIG. 2, cable 200 facilitates external identification with an externally supplied light source such as a flashlight or light pen 220. When a user at one end of cable 200 directs the externally supplied light source 220 at lens 206 of a selected cable 200, the identification element carries the light the length of cable 200 where it is magnified by the lens 206 at the other end such that a user at the other can visually identify the selected cable from a group of cables.

Although the depicted embodiment illustrates an optical fiber connected at both ends to a light pipe, other embodiments may include alternative combinations of optical fiber and light pipes. Thus, the identification element may include a single light pipe that extends between the pair of lenses 206, a single optical fiber, or an optical fiber connected to a light pipe at one end and directly to the lens at the other end.

Figure 3A:
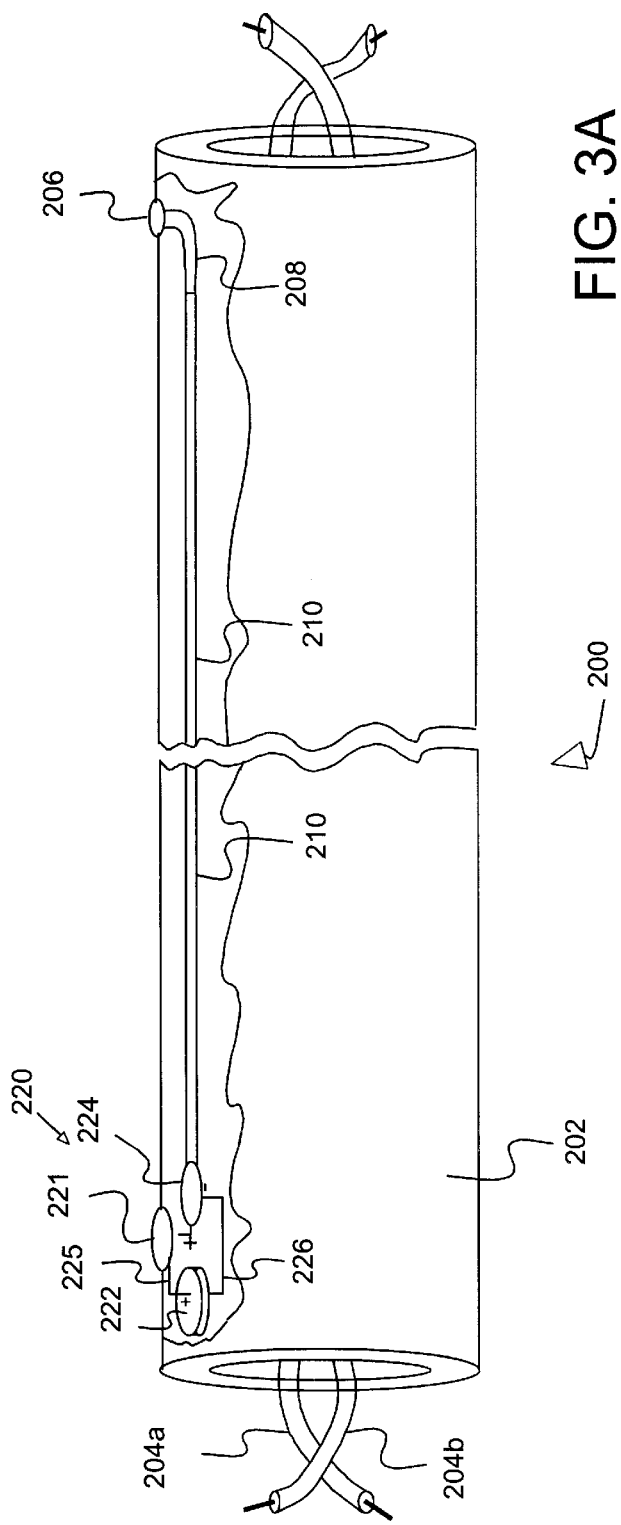
FIG. 3A depicts a cable according to an alternative embodiment of the invention.

Turning now to FIG. 3A, an embodiment of cable 200 is depicted in which the identification element includes an active circuit 220 for generating the light energy used to identify the cable. Active circuit 220 includes a source of electrical power, a light emitting device, and a switch to connect the source of power to the light emitting device. In the depicted embodiment, the source of power includes a battery 222, the switch is implemented as a button switch (contact switch) 221, and an LED 224 is used as the light emitting. device.

The contact switch 221 is embedded in the surface of the shielding 202 of cable 200 such that it is externally accessible. The battery 222 includes first and second terminals 225 and 226. In the depicted embodiment, first terminal 225 is connected between a positive voltage terminal of battery 222 and button switch 221 and second terminal 226 is connected between a negative voltage terminal of battery 222 and a negative voltage terminal of LED 224. In the absence of pressure applied to button switch 221, the positive terminal of LED 224 is floating and, thus, LED 224 generates no light. When pressure is applied to button switch 221, however, circuit 220 is closed and the battery voltage is applied across LED 224. When the circuit is closed, the voltage applied across LED 224 results in the generation of light.

Figure 3B:
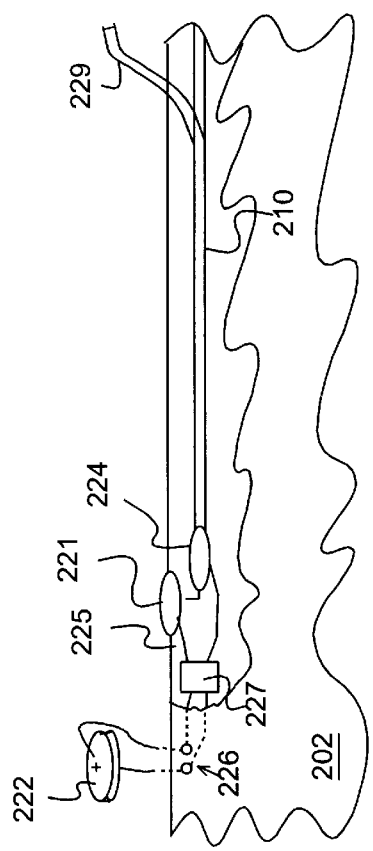
FIG. 3B depicts portions of a cable in which the identification element receives power from an external source.

Although the depicted embodiment of circuit 220 illustrates a contact switch, the switch may be designed with any suitable means for closing an electrical circuit. The switch could include, as examples, a magnetically actuated switch or a photoelectric switch. Similarly, although the depicted embodiment includes an internally mounted battery as the source of electrical power, the power source may be an external power source that is electrically connected to the light emitting device. In one such embodiment, depicted in FIG. 3B, the cable shielding 202 includes suitable connectors 226 for receiving leads that are connected to the external source of power. In this embodiment, the externally supplied power source reduces the cost and complexity of cable 200. A single external power source can be used on each cable 200 as needed.

In one embodiment, the source of electrical power delivers a DC signal that results in a continuous light produced at the other end of cable 200. In other embodiments, cables 200 may be further differentiated by producing varying electrical power signals on each cable 200. The power signal may be varied in time or frequency such that differing pulses are generated in each cable. In this manner, multiple cables 200 may be identified simultaneously by differences in the pulse widths or frequencies. This differentiation may be achieved by the inclusion of pulse code generator 227 in cable 200.

Pulse code generator 227 may include a simple circuit for producing a time varying signal at its output in response to a steady state input. Typically, a number of pulse code generators 227, each producing a different time varying signal, would be included in the set of cables 200. When two cables 200 are illuminated together, the differing pulse signatures produced by their respective generators 227 would differentiate the cables from one another.

In the depicted embodiment, LED 224 is in contact with an optical fiber 210 that is embedded in the shielding 202 of cable 200 and substantially traverses the length of cable 200. At the end of cable 200 distal from the circuit 220, optical fiber 210 is connected to a light pipe 208 and lens 206 in a manner similar to the arrangement of elements in the passive embodiment of cable 200 illustrated and described with respect to FIG. 2. The light generated by LED 224 will illuminate the lens 206 thereby enabling ready identification of the cable without requiring any disassembly of the system.

In one embodiment, the light energy may be passed from one cable 200 to another via switch panels 104 and 108 (FIG. 1). The optical fiber 210 in cable 200 may include a secondary fiber 229 (FIG. 3B) that connects to a suitable receptacle in switch panel 104 or 108. Typically, a second cable to which the switch panel connects cable 200 also connects secondary fiber 229 to a corresponding secondary fiber of the second cable. In this manner, the light energy may propagate from cables 103, through switch panel 104, cables 106, and switch panel 108, to cables 109 thereby facilitating visual identification of an entire electrical connection between first set of devices 101 and second set of devices 110. Alternatively, the cables 200 may include secondary electrical contacts that are passed to suitable sensors and generators in switch panels 104 and 108 to pass the electrical signal from cable to cable.

The cables 200 disclosed in FIGS. 2 and 3 thus enable a method of identifying a specific cable from a plurality of cables that interconnect data processing devices in a network. A light source such as LED 224 or light pen 220 is used to generate light at a first end of a selected cable. The second end of the selected cable is then identified from among multiple such cables by detecting generated light emitting from the second end of the selected cable. The method thus enables rapid identification of individual cables without manually tracing each cable.

It will be apparent to those skilled in the art having the benefit of this disclosure that the present invention contemplates cabling that facilitates visual identification of individual cables within a group of cables. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A cable suitable for use in a data processing network, comprising:
   electrically insulating shielding having an annular surface;
   a signal carrying element enclosed by the shielding;
   a cable identifying element embedded in the shielding and suitable for transporting light from a first end of the cable to a second end and further suitable for externally emitting the light radially to the cable through an opening in the annular surface of the shielding at the second end.

2. The cable of claim 1, the identification element is a passive element configured to receive externally supplied light energy at the first end.

3. The cable of claim 1, wherein the identifying element includes an optical fiber.

4. The cable of claim 3, wherein a second end of the optical fiber is connected to a second end lens embedded in a radial surface of the shielding at the second end of the cable.

5. The cable of claim 4, wherein a first end of the optical fiber is connected to a first end lens embedded in a radial surface of the shielding at the first end of the cable.

6. The cable of claim 4, wherein a first end of the optical fiber is connected to an LED embedded in the shielding.

7. The cable of claim 6, wherein the LED is connected to a circuit including a source of electrical power and a switch.

8. The cable of claim 4, wherein the identifying element includes a second end light pipe connected between the second end lens and the optical fiber.

9. The cable of claim 5, wherein the identifying element includes a first end light pipe connected between the first end of the optical fiber and the first end lens.

10. The cable of claim 9, wherein the optical fiber is approximately 9 to 1000 micrometers in diameter.

11. A data processing network, comprising:
   a plurality of data processing devices, each data processing device including processor, memory, display and input means; and
   a cable connecting at least two of the data processing devices, wherein the cable includes electrically insulating shielding having an annular surface, a signal carrying element enclosed by the shielding, and an identifying element embedded in the shielding and suitable for transporting light from a first end of the cable to a second end and further suitable for externally emitting the light radially to the cable through an opening in the annular surface of the shielding at the second end.

12. The data processing system of claim 11, wherein a second end of the optical fiber is connected to a second end lens embedded in a radial surface of the shielding at the second end of the cable.

13. The data processing system of claim 12, wherein a first end of the optical fiber is connected to a first end lens embedded in a radial surface of the shielding at the first end of the cable.

14. The data processing system of claim 12, wherein a first end of the optical fiber is connected to an LED embedded in the shielding.

15. The data processing system of claim 13, wherein the LED is connected to a circuit including a source of electrical power and a switch.

16. The data processing system of claim 12, wherein the identifying element includes a second end light pipe connected between the second end lens the second end of the optical fiber.

17. The data processing system of claim 13, wherein the identifying element includes a first end light pipe connected between the first end lens and the first end of the optical fiber.

18. A method of tracing a cable in a data processing network, comprising:

generating light at a first end of one of a plurality of cables interconnecting two or more data processing devices in the data processing network; and identifying a second end of the one cable by detecting the generated light emitting radially from the second end of the one cable.

19. The method of claim 18, wherein generating light at the first end of the one cable includes shining a light source at a lens embedded in a shielding of the first end of the cable.

20. The method of claim 19, wherein generating light at the first end of the one cable includes activating a button switch embedded in a shielding of the first end of the cable.

21. The method of claim 18, wherein the generated light emerges from a lens embedded in a radial surface of cable shielding at the second end of the cable.

* * * * *